United States Patent [19]
Arakelov et al.

[11] 3,892,034
[45] July 1, 1975

[54] METHOD OF ASSEMBLING SLOTLESS STATOR OF ELECTRICAL MACHINE

[76] Inventors: Mikhail Alexandrovich Arakelov, ulitsa Oktyabrskaya, 303; Eduard Galaktionovich Gersamia, ulitsa Oktyabrskaya, 34, kv. 14.; Tengiz Grigorievich Zedgenidze, prospekt 1, Chavchavadze, 76; Gennady Pavlovich Nozadze, ulitsa Lenina 76, all of Tbilisi, U.S.S.R.

[22] Filed: Feb. 26, 1974

[21] Appl. No.: 445,998

[52] U.S. Cl. ............... 29/596; 29/205 R; 29/205 D; 29/606; 156/239; 156/272; 310/45
[51] Int. Cl. ........................................... H02k 15/02
[58] Field of Search...... 29/596, 606, 205 R, 205 D; 156/230, 239, 272; 310/45

[56] References Cited
UNITED STATES PATENTS

| | | | |
|---|---|---|---|
| 3,412,453 | 11/1968 | Larsen | 29/596 X |
| 3,628,240 | 12/1971 | Bender | 29/596 |

*Primary Examiner*—Carl E. Hall
*Attorney, Agent, or Firm*—Holman & Stern

[57] ABSTRACT

The disclosure relates to the production of electrical machines and more specifically to assembling the stator of a slotless electrical machine. The essence consists in splitting the process of assembling the slotless stator of an electrical machine into such production operations and in fulfilling these operations in such succession that it is possible to create an active distributed layer from separate coil groups beyond the yoke of the slotless stator being assembled and then to transfer simultaneously all coil groups of the assembled active distributed layer onto the surface of said yoke. The device for assembling a slotless stator of an electrical machine is provided with a bed frame, an assembling template movably installed on the bed frame and having a magnetizing winding, on which template coil groups are fixed in given relative positions by means of a magnetic field, a yoke holder stationarily installed on the bed frame, coaxially with the assembling template, with said yoke having a magnetizing winding with the contour of its opening corresponding to the outer contour of the yoke of the slotless stator under assembly, a former of head portions of coil groups, comprising two punches disposed at different sides of said yoke holder, coaxially therewith, and having a possibility for longitudinal reciprocal displacement in relation to said yoke holder.

2 Claims, 4 Drawing Figures

METHOD OF ASSEMBLING SLOTLESS STATOR OF ELECTRICAL MACHINE

BACKGROUND OF THE INVENTION

The present invention relates to electrical engineering, particularly to the production of electrical machines and more specifically to a method of assembling a stator of a slotless electrical machine and a device to realize the given method.

It is generally known that in assembling conventional type stators with non-salient poles, first the stator lamination pack (non-wound stator) is made whose lamination steel has a yoke and slot zones stamped together, then the stator pack receives conducting material either by winding wire directly in its slots (combined winding) or by inserting wire turns made separately (separate winding and placing) into slots to produce a wound stator.

The selection of the production process to make a wound stator, or the stator assembling process is determined by the design features of the geometry of a non-wound stator, windings and insulating parts.

In machines with combined operations of forming turns and placing them into stator pack slots, the wire feeding elements of the machine are moving in a certain trajectory whose perimeter differs from the perimeter of a turn of the winding. In the course of forming a turn, the tension of wire being wound varies (even a free loop may occur), and excessive axial and radial displacement of wire occurs when it slides over the surfaces of the turn forming components (templates, hooks), or in other words, a turn is obtained by winding wire over the curved surface of forming templates without any strict fixation.

This gives rise to the following disadvantages of the given method of stator assembling by a machine tool: relative elongation of wire (up to 10%) during the placement thereof, increased ohmic resistance of the winding, damaged insulating coating of winding wires, poor dependability of the machine equipment due to a complex trajectory of the operating motions of the wire feeding element which performs up to eight discrete motions, with two of them being performed at a distance of 300 and 400 mm, during a single cycle lasting about 0.1 sec.

A distinguishing feature of machines with separate operations of forming turns and placing them into the slots of the stator pack is winding a wire over the template of the given dimensions and configuration. A turn of the winding is made during this process under relatively stable conditions to acquire distinct geometric dimensions on the winding template. However, further operations of assembling turns into a winding and placing the latter into stator slots involve a substantial disadvantage because the process of inserting wire turns through the narrow entrance of the slot is accompanied with forcing the wire inward with a possible jamming of wires.

A somewhat more advanced method of separate forming and placing of windings into the slots of a stator pack is a method of their axial insertion according to which, coils made on the winding template are inserted singly into stator pack slots from the side of one of the stator ends.

However, none of the above methods of assembling the conventional type wound stator is suitable for assembling the stator of a slotless electrical machine. This is because the non-wound stator of a slotless electrical machine substantially differs in its design from that of the conventional type electrical machine.

The stator pack of a slotless machine has only a yoke zone, but no slot zone whatever. Therefore, assembling this type of stator includes the principally new processes, a creation of an active distributed layer of the stator and its cementing to the stator yoke pack. As is known, the active distributed layer of the stator represents a multilayer winding comprising ferromagnetic elements between the layers of the winding whose geometry corresponds to the perimeter of the stator yoke bore. To obtain a rotating magnetic field in an electrical machine of this type, the active distributed layer is arranged of a plurality of elementary multilayer windings with ferromagnetic elements between layers, so called coil groups, which are interconnected (wired) into a common active distributed layer of the stator by means of an electric circuit.

As is known, the process of a manual assembling of a slotless electrical machine includes operations performed in a succession given below: coating the yoke surface with a cementing compound, successive introduction of each coil group into the yoke, successive positioning of each coil group in the corresponding position of the yoke, determined by a preliminary marking off and availability of corresponding fixing elements at this position. This assures the required relative positioning of all coil groups of the active distributed layer in the assembled machine; pressing each coil group to the yoke from their sides (commonly by means of a screw clamp) with a force sufficient for holding the coil group in the course of its cementing and for reliability of this process; curing during a time period needed for polymerization of the cementing compound; releasing the force of pressing the coil group to the yoke (by unscrewing and removing the screw clamp); and realizing all required electrical connections (wiring of electrical circuit).

It is obvious that the above described method of assembling the stator of the slotless electrical machines requires so much labor-intensive (especially the processes of successive introduction of coil groups into the inside of the yoke and their temporary securing on its surface by means of screw clamps until the polymerization process of cementing compound is finished) that mass production of electrical machines with a slotless stator on the basis of the above described method is believed to be impossible.

Attempts to mechanize assembling operations in the process succession adopted for the manual stator assembling method have not yielded the desired results because the functional layout of manipulators to perform the actions of placing and fixing coil groups on the surface of the stator yoke is too complicated, unreliable and low productive as a temporary fixing by manipulators of even two or three coil groups simultaneously is difficult due to a limited space in the stator yoke bore.

Therefore, a problem has arisen in developing a principally new assembling technique to meet the requirements of mass production of the slotless stators to the fullest extent.

OBJECTS AND SUMMARY OF THE INVENTION

The object of the invention is to provide a new method of assembling the slotless stator of an electrical machine and to provide a device to realize this method to make possible an automated highly-productive slotless stator assembling process.

The invention is principally based on splitting the electrical machine slotless stator assembling process into such production operations and into such a succession of accomplishing these operations that it is possible to create an active distributed layer from separate coil groups beyond the yoke of the slotless stator being assembled and then to transfer simultaneously all coil groups of the assembled active distributed layer on to the surface of said yoke.

This is achieved due to the provision of a method of assembling a slotless stator of an electrical machine with an active distributed layer whose coil groups are cemented to the stator yoke, comprising coating the yoke surface with a cementing compound, introducing coil groups into the yoke, fixing the coil groups in the given relative positions on the yoke surface coated with cementing compound and pressing them to said yoke surface with a force sufficient for holding the coil groups in the process of their cementing during a time period needed for polymerization of the cementing compound, removing said force by which the coil groups have been pressed to the yoke surface, the accomplishing of all electrical connections and the forming of head portions of coil groups according to the invention, in which coil groups are first fixed by a stationary magnetic field on the assembling template to assure the given relative positioning thereof, then all electrical connections are accomplished to result in the creation of an active distributed layer, thereafter said assembling template with said active distributed layer is introduced into the yoke whose surface is preliminarily coated with a cementing compound, then a stationary magnetic field is established to magnetize the yoke of the slotless stator being assembled and said stationary magnetic field is removed from the assembling template which results in the simultaneous transfer of all coil groups of the active distributed layer onto the yoke surface and their pressing with a force sufficient for holding during the cementing process, and after curing within a time period sufficient for polymerization of cementing compound the stationary magnetic field is removed from the yoke side, and the head portions of coil groups are formed. It is possible to accelerate the polymerization of cementing compound through heating by utilizing the induction loss in steel of the slotless stator being assembled when a variable magnetic field is brought to it.

To realize the above slotless stator assembling method it is expedient to provide a device comprising: a bed frame; an assembling template mounted movably in relation to the bed frame and having a magnetizing winding, on which template, coil groups are fixed in the given relative positions by means of a magnetic field; a holder of the yoke with a magnetizing winding, said holder being stationarily mounted on the bed frame, coaxially with the assembling template, the contour of the opening in the winding corresponding to the outside contour of the yoke of the slotless stator being assembled; a former of head portions of coil groups; means for forming head portions of coil groups by bending and pressing these head portions, and a drive to provide required motions and forces needed in slotless stator assembling.

It is also expedient that in the present device the assembling template comprises a housing of ferromagnetic material with a cylindrical surface adapted for the positioning thereon of coil groups of the slotless stator being assembled, with a space to accomodate the magnetizing winding of the assembling template and with an axle shaft at the side of one of the ends thereof, a magnetizing winding of the assembling template, accomodated in said space of said housing, a sleeve of non-magnetic material forming together with said axle shaft a rotating pair and having a tail piece to mount the assembling template on the corresponding base. In the device, it is feasible to adapt the yoke holder to comprise a circular casing of ferromagnetic material and the magnetizing winding of the yoke, while said circular casing would have a base in the form of a hollow cylinder and side cheeks with one of the cheeks being removable to permit the insertion of the magnetizing winding of the yoke into the circular casing when mounting the yoke holder.

It is expedient that in the present device the former of the head portions of coil groups is adapted to comprise two punches positioned at different sides from the yoke holder, coaxially therewith, and having a possibility for longitudinal reciprocal displacement in relation to the yoke holder, each of said punches would be in the form of a shaped washer composed of a plurality of segments, the end surface of said washer facing the yoke holder being shaped to match the given shape of head portions of the coil groups of the assembled slotless stator while each of said segments is spring-loaded in the radial direction and having a possibility for radial reciprocating displacement.

The method pursuant to the invention and the device to realize the method permits a highly efficient process of assembling slotless stators of electrical machines, thus opening a way for the mass production of high quality electrical machines of this type.

In addition, the device for assembling slotless stators of electrical machines is simple in design, reliable in operation and is easily installed in a flow line for the production of corresponding electrical machines.

DETAILED DESCRIPTION OF THE INVENTION

Pursuant to the invention, the method of assembling a slotless stator of an electrical machine consists in that all operations related to the provision of an active distributed layer from coil groups are performed beyond a yoke of the slotless stator being assembled, on an assembling template and, then all the coil groups of the active distributed layer are simultaneously transferred onto an inner cylindrical surface of the yoke and cemented to this surface. In this, coil groups are fixed on the assembling template and then transferred onto the inner cylindrical surface of the yoke of the stator being assembled by means of stationary magnetic field.

The slotless stator assembling process is terminated in the forming of head portions of the stator coil groups.

To accelerate the process of polymerization of the cementing compound when cementing coil groups of the active distributed layer to the inner cylindrical surface of the yoke, a variable magnetic field is brought to the stator to heat it due to an induction loss in the steel of the stator being assembled. The distinguishing features of the method according to the invention as compared with a manual slotless stator assembling method known heretofore are as follows: firstly, a radically new assembling principle consisting in dividing the entire slotless stator assembling process into two stages with one of the stages comprising all operations for the provision of the active distributed layer beyond the yoke of the stator being assembled, on the assembling template, and the other assembling stage comprising all the remaining operations performed on the yoke of the slotless stator being assembled; secondly, the introduction of radically new operations, unknown heretofore, of fixing coil groups on the assembling template by means of a magnetic field and a simultaneous transfer of all coil groups of the created active distributed layer from the assembling template onto the inner cylindrical surface of the yoke by means of magnetic field; thirdly, the succession of operations is also a novelty. For example, the accomplishment of all electrical connections for the creation of the active distributed layer according to the known method is performed after cementing the coil groups to the inner cylindrical surface of the yoke, while in the novel method according to the invention all electrical connections for the provision of the active distributed layer are accomplished beyond the yoke before cementing the coil groups to the yoke.

In fact, known to the existing level of technology for assembling slotless stator may be considered only the following most general operations common to those included in the novel method: introducing the coil groups into the yoke; fixing of coil groups in the given relative positions on the yoke surface coated with a cementing compound; pressing of the coil groups to this yoke surface with a force sufficient for holding the coil groups in the course of their cementing, curing within a time period needed for polymerization of the cementing compound; removing said force which was applied to press the coil groups to the yoke surface; accomplishing all electrical connections and forming head portions of coil groups.

In assembling a slotless stator by the method according to the invention the following operations with account of those novel ones stated above are realized in the following succession:

1. coil groups made for the slotless stator are fixed by a stationary magnetic field on the assembling template to assure given relative positioning thereof;

2. all electrical connections are accomplished to result in the provision of an active distributed layer;

3. said assembling template with said active distributed layer is introduced into the yoke whose surface is preliminarily coated with a cementing compound;

4. stationary magnetic field is established to magnetize the yoke and the afore mentioned stationary magnetic field is removed from the assembling template for a simultaneous transfer of all coil groups of the active distributed layer onto the yoke surface and pressing them with a force sufficient for holding the coil groups in the course of their cementing;

5. additionally, a variable magnetic field is established to cause induction losses in the steel of the stator being assembled for the purpose of heating thereof;

6. the slotless stator being assembled is cured within a time period needed for the polymerization of cementing compound;

7. stationary and variable magnetic fields acting on the yoke of the slotless stator being assembled are removed;

8. head portions of coil groups are formed by bending them toward the ends of the yoke with a subsequent pressing.

With respect to the actually described embodiment of the process of assembling the slotless stator of an electrical machine in said first operation, the given relative positioning of the coil groups, namely their uniform positioning along the circumference is achieved by selecting such a value of the diameter of the side cylindrical surface of the assembling template to which the coil groups have to be fixed that the sections of adjacent coil groups adjoining said side surface of the assembling template would directly abut one another after fixing all coil groups on the assembling template. Then, after placing the first coil group on the assembling template a the second coil group is placed so that its section adjoining the side surface of the assembling template would directly abut the corresponding section of the first coil group. Following coil groups are placed on the assembling template in a similar way.

The present method of assembling the slotless stator of an electrical machine will be more clearly revealed in all its aspects upon a perusal of the following description of the specific structural embodiments of the relevant devices for the realization of this method.

One such structural embodiment of present device incorporating a manual drive, comprises a bed frame 1 (FIG. 1), an assembling template 2 movably mounted on said bed frame, a holder 3 of a yoke 4 of a slotless stator of an electrical machine being assembled, said holder, being stationarily mounted on said bed frame, means for forming head portions of the coil groups in the form of two punches 5 and 5¹, and a drive consisting of two gearing arrangements 6 and 6¹.

Figure 1:
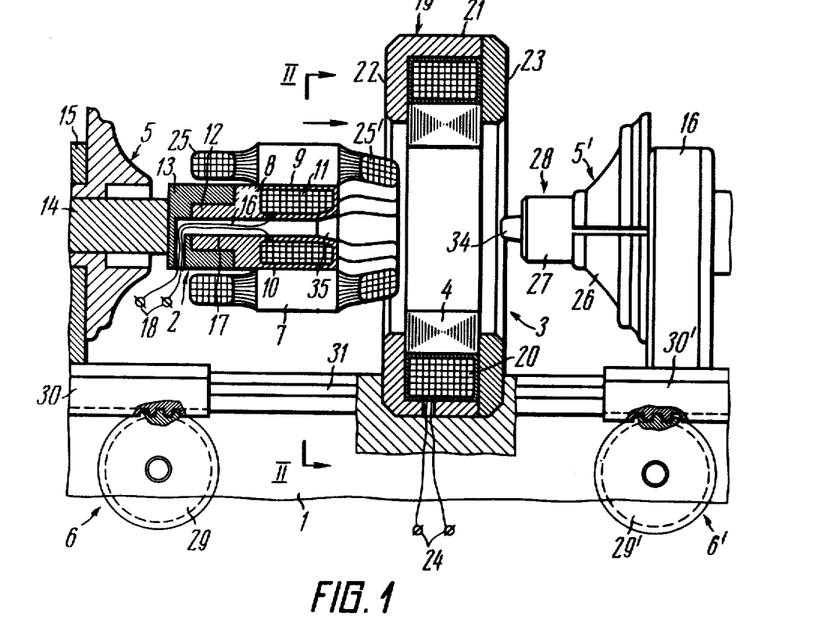
FIG. 1 is a front partially sectional view of the manually-operated device for assembling the slotless stator of electrical machine, according to the invention.

In the device, the assembling template 2 is the basic unit on which all assembling operations related to the provision of an active distributed layer are performed, namely: fixing of all coil groups 7 in the given relative positions by means of a magnetic field and the accomplishment of all electrical connections. For these operations to be effected, the assembling template 2 incorporates a housing 8 of ferromagnetic material with a cylindrical side surface 9 adapted to dispose thereon the coil groups 7, and a space 10 (reference line in the drawing indicates the space limiting contour).

The space 10 houses a magnetizing winding 11 of the assembling template, which when energized by direct current establishes a magnetic field to fix the coil groups 7 on the assembling template 2. One of the ends of the housing 8 terminates in an axle shaft 12 entering a sleeve 13 of non-magnetic material forming together with the axle shaft 12 a rotating pair. The sleeve 13 has a tail piece 14 by means of which the sleeve and consequently the entire assembling template is installed in a stock 15 serving as a base therefor.

Use of non-magnetic material for the sleeve 13 is dictated by the necessity to prevent a secondary magnetic circuit across the bed frame and other units of the device so that the larger portion of the magnetic flux created by the magnetizing coil 11 when energized by direct current would flow through the cylindrical side surface 9 of the housing 8 to fix the coil groups 7 on said surface.

Leads from the magnetizing coil 11 through a sliding contact (not shown) and conductors 16 introduced in a through hole 17 of the housing 8 of the assembling template 2 are electrically connected to terminal clamps 18.

The holder 3 of the yoke 4 is rigidly secured on the bed frame 1.

The holder comprises a circular casing 19 of ferromagnetic material and a magnetizing winding 20 is accomodated within the circular casing 19. The magnetizing winding 20 has an inner diameter corresponding to the outer diameter of the yoke 4 of the slotless stator being assembled so that the latter can be installed inside the magnetizing winding 20, and an outer diameter corresponding to the inner diameter of the circular casing 19 so that the casing 19 can encompass the magnetizing winding 20 and be adjacent to its side and end surfaces.

The circular casing 19 incorporates a base 21 in the form of a half-cylinder and side cheeks 22 and 23 flaring from the cylinder, with the side cheek 23 being removable to permit the insertion of the magnetizing winding 20 into the circular casing 19 when mounting the holder 3 of said yoke, while the side cheek 22 is non-removable and integral with the base 21. The inner diameter of cheeks 22 and 23 is less than the inner diameter of the magnetizing winding 20. Due to this, with the yoke 4 installed in the holder 3 a closed magnetic circuit is formed with sections of ferromagnetic material, which are the base 21, the side cheeks 22 and 23 of the holder 3, and also the yoke 4 per se.

As a result, a magnetic flux of the required intensity is developed in the yoke 4 when the magnetizing winding 20 is electrically energized and the dissipation of said magnetic flux is minimized. Leads from the magnetizing winding 20 are connected to terminal clamps 24.

Figure 3:
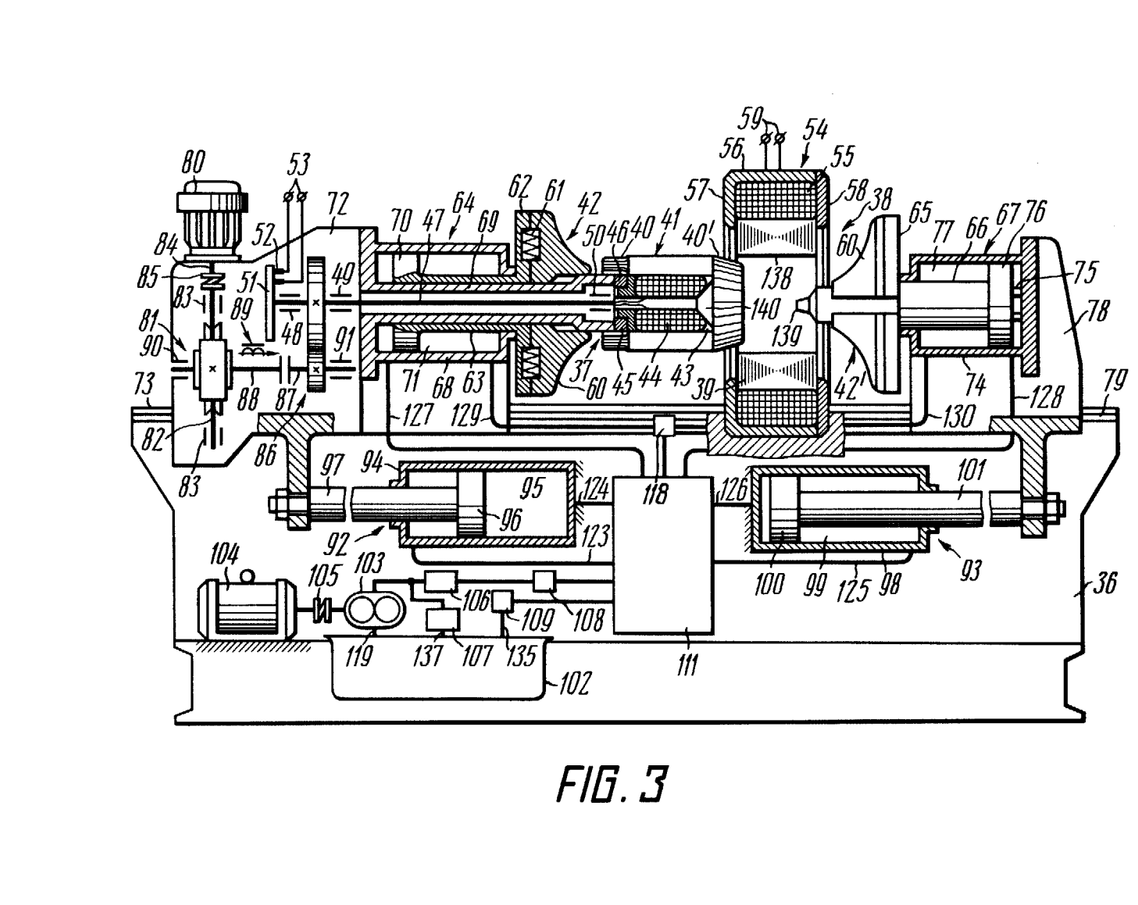
FIG. 3 is a front partially sectional view of the automatically-operated device for assembling the slotless stator of electrical machine, according to the invention.

The means for forming head portions 25, 25¹ of the coil groups 7, as stated above, comprises two punches 5 and 5¹. These punches are located at different sides of the holder 4 of the yoke and coaxially therewith. Each of the punches 5 and 5¹ is in the form of a shaped washer composed of a number of segments 26. The end surface of the punch facing the yoke holder is a forming surface and is shaped according to the given shape of the head portions of coil groups of the assembled slotless stator. Each of segments 26 is spring-loaded and installed for possible radial reciprocal displacement (springs are not shown in FIG. 1 and possibility for radial displacement is not revealed clearly enough, however FIG. 3 illustrating the following portion of the description will make the punch design more apparent).

The punch 5 is mounted on the tail piece 14 with a possible longitudinal reciprocal displacement, while the tail piece per se is rigidly secured in the stock 15.

The punch 5¹ is mounted for possible longitudinal reciprocal displacement on a side surface 27 of a center 28 which in its turn is rigidly secured in a stock 16.

The drive to provide the required motions and forces in assembling the slotless stator, as mentioned above, comprises two gearing arrangements 6 and 6¹ each incorporating a pinion 29 and 29¹ respectively, and a toothed rack 30 and 31 respectively, meshing with the respective pinion. The toothed racks are movably mounted on guide members 31 of the bed frame 1. Rigidly secured to the toothed rack 30 is the stock 15, while the stock 16 is rigidly secured to the toothed rack 30¹. The pinions 29 and 29¹ are driving elements to be actuated by means of corresponding handles or handwheels connected thereto (not shown in FIG. 1 to make the drawing simpler).

Figure 2:
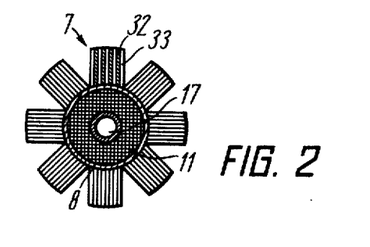
FIG. 2 is a sectional view of the device, taken along the line II—II of FIG. 1, the view looking in the direction of the arrows.

The procedure of assembling slotless stator of electrical machine using the device disclosed is as follows (FIG. 1, 2).

In the initial position, the stocks 15 and 16 are moved away from the holder 3 of the yoke to the extreme positions. In order to move the stock 15 to the extreme left-hand position, the pinion 29 should be rotated in the counterclockwise direction. Similarly, in order to move the stock 16 to the extreme right-hand position, the pinion 29¹ should be rotated. A source of direct current with its own switch (not shown) is connected to the magnetizing winding 11 of the assembling template 2 through the terminal clamps 18. The source of direct current with a corresponding switch (not shown) is also connected to the magnetizing winding 20 of the yoke holder through the terminal clamps 24. Said latter switches are in the OFF position and the magnetizing windings 11 of the assembling template and the magnetizing winding 20 of the yoke holder are deenergized. First, the yoke 4 of the slotless stator under assembly is installed in the holder 3 of the yoke.

Now, the electrical circuit of the magnetizing winding 11 of the assembling template is closed by actuating the corresponding said switch of said source of direct current. Direct current will flow through the magnetizing winding 11 of the assembling template to establish a magnetic field to magnetize the housing 8 of the assembling template. Then, the coil groups 7 are placed in the given relative positions on the side surface 9 of the housing 8 of the assembling templatle 2. As mentioned above, each coil group 7 incorporates alternated layers of active materials; namely conductors 32 (FIG.2) and steel laminations 33. Due to the steel laminations incorporated in the coil groups, the coil groups 7 when placed on the side surface 9 will be reliably fixed on this side surface by the action of a magnetic field.

Before placing a next coil group 7 on the side surface 9, an operator performing the assembling turns the housing 8 to a position at which he finds the corresponding operation to be performed most conveniently.

Then, the electrical circuit of the slotless stator is wired by accomplishing all the required electrical connections, resulting in the provision of an active distributed layer consisting of the coil groups 7 fixed on the assembling template 2. The surface of the yoke is coated with a cementing compound. Thereafter, by means of the drive gearing arrangement 6, the assembling template together with the active distributed layer carried thereby is introduced with coil groups 7 into the yoke and installed in such a position that the active distributed layer is arranged symmetrically in relation to the yoke 4. Actuating the drive gearing 6¹ the stock 16 is moved toward the yoke holder 3 until a cone 34 of the center 28 enters a tapered bore 35 in the housing 8 of the assembling template 2. During this action, the assembling template 2 per se together with the active distributed layer carried thereby will be accurately fixed in a position needed for effecting the subsequent operations.

Thereafter, using the above mentioned switches of the direct current source, the magnetizing winding 20 of the yoke holder 3 is energized and the magnetizing winding 11 of the assembling template 2 is deenergized.

As a result, the yoke 4 of the slotless stator being assembled is magnetized by the action of the magnetic field established by the magnetizing winding 20 and all the coil groups 7 of the active distributed layer are simultaneously transferred onto the cement-coated inner surface of the yoke 4 and fixed thereon.

Further on, the slotless stator under assembly is cured in this position during a time period needed for the polymerization of the cementing compound and consequently for a reliable cementing of the coil groups 7 of the active distributed layer to the yoke 4. To accelerate the process of polymerization of the cementing compound and consequently to substantially accelerate the entire process of assembling the slotless stator, the compound is heated through utilizing the induction loss in the steel of the slotless stator under assembly when a variable magnetic field is brought to it.

For this purpose, corresponding switching is performed in the winding 20 of the yoke holder 3 by switching off a number of coils in this winding and connecting this number of coils to a source of alternating current. As a result, eddy currents are induced in the yoke 4 to heat the yoke by alternating current. During this, the direct current supply to the remaining number of coils of the yoke holder 3 is continued to assure a reliable holding of the coil groups in the fixed position on the yoke 4.

However, switching in the winding 20 of the yoke holder is not to be done obligatorily to effect heating of the cementing compound by induction loss in the steel of the slotless stator under assembly. It is possible, while keeping this winding connected to the direct current source, to connect the coil groups 7 of the active distributed layer to an alternating current source. In this case, eddy currents are induced in all steel parts of the slotless stator under assembly both in the yoke 4 and in the steel laminations 33 of the coil groups 7.

Naturally, when using the coil groups 7 for this induction heating, the winding 20 of the yoke holder 3 can be made either sectional to comprise several coils or non-sectional to comprise a single coil. In the case when the winding 20 per se of the holder 3 is used for induction heating, this winding 20 should be obligatorily sectional to comprise several coils. In addition, a corresponding switching device should be provided to isolate a number of coils of the magnetizing winding 20 from the direct current circuit to which this magnetizing winding is connected without stopping the direct current supply to the remaining coils of the winding 20 of the yoke holder 3.

Upon completing the process of polymerization of the cementing compound and consequently upon the reliable cementing of the coil groups 7 of the active distributed layer to the yoke 4 of the slotless stator under assembly, the coils of the magnetizing winding 20 are disconnected from the power sources (a number of coils, from alternating current source, the remaining coils, from direct current source). Then, the head portions 25, 25¹ are formed by bending toward the ends of the yoke 4 of the slotless stator under assembly and subsequent pressing the same.

To achieve this, the punches 5 and 5¹ are brought toward the yoke holder 3 by means of a corresponding feeding mechanism provided for the punches 5 and 5¹ (this mechanism is not shown to simplify the drawing in FIG. 1). The punches 5 and 5¹ upon coming into contact with the head portions of the coil groups 7, punch 5 with the head portion 25 and the punch 5¹ with head portion 25¹, initially bend the head portions toward the ends of the yoke 4, then press these head portions imparting thereto the given form to correspond to said forming surfaces of the punches 5 and 5¹. Then, punches 5 and 5¹ are retracted to the initial position by means of said feeding mechanism.

Similarly, but by means of the gearing arrangements 6 and 6¹, the stock 15 carrying the assembling template 2 and punch 5, and the stock 16 carrying the center 28 and punch 5¹ are retracted to the initial position.

Upon removing the cheek 23 of the circular casing, the assembled slotless stator is taken out of the holder 3.

In describing the given structural embodiment of the invented device for assembling slotless stators of electrical machines, particular attention has been paid to the explanation of the essence of the invention and what is really of the invention character has been explained in full detail. For example, the description of those engineering solutions which made possible the accomplishment of operations related to the provision of the active distributed layer from coil groups beyond the yoke of the stator being assembled, and also the transfer of this active distributed layer onto the yoke of the slotless stator being assembled.

At the same time, in order not to overload the accompanying drawings (FIGS. 1 and 2,) no detailed description was given about certain elements or units of the present device which are generally known to those skilled in the art and are used in their direct purpose to be built in the present device on the basis of generally known and typical structural solutions.

In particular, the above mentioned punch feeding mechanism may be constructed the same as any one of many feeding mechanisms used in metal cutting and other similar machine tools.

Now, the description will be given of another structural embodiment of the invented device for assembling slotless stators of electrical machines, incorporating an automated drive based on the hydraulic control system which is widely popular in machine tools.

This device comprises a bed frame 36 (FIG. 3), assembling template 37. A holder 38 for a yoke 39 of the slotless stator of electrical machine, said holder being stationarily mounted on said bed frame, means for forming head portions 40 and 40¹ of coil groups 41, taking the form of two punches 42 and 42¹, and an automated drive.

In the given structural embodiment, the assembling template 37 is constructed similar to the assembling template of the first described embodiment. It comprises a housing 43 of ferromagnetic material with a cylindrical side surface adapted to position the coil groups 41 thereon, a magnetizing winding 44 positioned in a space of the housing 43, a sleeve 45 of nonmagnetic material accomodating an axle shaft 46 provided at one of the ends of the housing 43 and rigidly connected to said sleeve, a hollow shaft 47 installed in bearings 48–50, a sliding contact with two slip rings 51 connected to the leads of the magnetizing winding 44, and two brushes 52 connected to terminal clamps 53 adapted to connect a direct current source (not shown) to said brushes and consequently to the magnetizing winding 44.

The yoke holder 38 is rigidly secured on the bed frame 36. The holder comprises a circular casing 54 of ferromagnetic material and a magnetizing winding 55 accomodated inside the circular casing 54.

The magnetizing winding 55 has an inner diameter corresponding to the outer diameter of the yoke 39 so that the stator under assembly can be installed inside the magnetizing winding 55, and an outer diameter corresponding to the inner diameter of the circular casing 54 so that the casing 54 encompasses the magnetizing winding 55 while being adjacent to its side and end surfaces.

The circular casing 54 has a base 56 in the form of a hollow cylinder and side cheeks 57 and 58 flaring therefrom, with the side cheek 58 being removable so that the magnetizing winding 55 can be inserted into the circular casing 54 when mounting the holder 38 of said yoke, while the side cheek 57 is non-removable and integral with the base 56. The inner diameter of the cheeks 57 and 58 is less than the inner diameter of the magnetizing winding 55. Due to this fact, with the yoke 39 of the slotless stator under assembly installed in the holder 38, a closed magnetic circuit is established with sections of ferromagnetic material and these sections are the base 56 and the side cheeks 57 and 58 of the holder 38, and the yoke 39 per se.

As a result, a magnetic flux of the required intensity is provided in the yoke 39 when the magnetizing winding 55 is supplied with electric current and dissipation of said magnetic flux is minimized. Leads from the magnetic winding 55 are connected to terminal clamps 59. The means for forming head portions 40, 40¹ of the coil groups 41 as stated above, incorporates two punches 42 and 42¹. These punches are located at different sides of the yoke holder 38 and coaxially therewith.

Each of the punches 42, 42¹ has the form of a shaped washer composed of a number of segments 60. The end surface of the punch facing the yoke holder is a forming surface and has a shape corresponding to the shape of the head portion of the coil groups of the assembled slotless stator. Each of the segments 60 is spring-loaded by means of a spring 61 and installed for possible radial reciprocal displacement in relation to the movable base common for all the segments of the given punch and in its turn is given a possibility for axial reciprocal displacement.

This movable base for all the segments 60 of the punch 42 is constituted by a flared portion 62 of a rod 63 of a hydraulic cylinder 64, while for all the segments 60 of the punch 42¹, the movable base is represented by a flared section 65 of a rod 66 of a hydraulic cylinder 67. A casing 68 for the hydraulic cylinder 64 is in the form of a cup incorporating a hollow core 69 with a piston 70 mounted thereon and integral with the rod 63, and a space 71 for hydraulic fluid. The casing 68 of the hydraulic cylinder 64 is rigidly secured on a front stock 72 mounted on guide members 73.

A casing 74 of the hydraulic cylinder 67 also is in the form of a cup incorporating a hollow core 75 with a piston 76 mounted thereon and integral with the rod 66, and a space 77 for hydraulic fluid. The casing 74 of the hydraulic cylinder 67 is rigidly secured on a rear stock 78 installed on guide members 79.

An automated drive which provides the required motions and forces for assembling slotless stator comprises an assembling template turning mechanism, a stock displacing mechanism and a punch displacing mechanism.

The mechanism for turning the assembling template 37 comprises an electric motor 80, a worm reduction unit 81 whose imput shaft 82 is installed in bearings 83 and connected to a shaft 84 of the electric motor through a coupling 85, a gear reduction unit 86 whose input shaft 87 is connected to an output shaft 88 of the worm reduction unit 81 through an electromagnetic coupling 89, and 90 and 91 are bearings of the worm reduction unit output shaft and the gear reduction unit input shaft, respectively. The above mentioned hollow shaft 47 of the assembling template plays the role of the output shaft of the gear reduction unit.

The mechanism for displacing the stocks 72 and 78 comprises a hydraulic cylinder 92 for displacing the front stock 72 and a hydraulic cylinder 93 (for displacing the rear stock 78).

The hydraulic cylinder 92 includes, a casing 94 with a space 95 for hydraulic fluid; a piston 96 located in the space 95 of the casing 94 and integrated with a rod 97. The casing 94 is rigidly secured on the bed frame 36, while the rod 97 is directly connected to the front stock 72.

The hydraulic cylinder 93 includes a casing 98 with a space 99 for hydraulic fluid; a piston 100 located in the space 99 of the casing 98 and integrated with a rod 101. The casing 98 is rigidly secured on the bed frame 36, while the rod 101 is directly connected to the rear stock 78.

The mechanism for displacing the punches 42 and 42¹ includes the above described hydraulic cylinders 64 and 67, the hydraulic cylinder 64 for displacing the punch 42 and the hydraulic cylinder 67 for displacing the punch 42¹.

As generally known, the power medium needed for operation of hydraulic cylinders is hydraulic fluid delivered under pressure into the space of the corresponding hydraulic cylinder at either side of its piston. Therefore, the hydraulic control system which has been principally adopted in the present device for assembling the slotless stators should incorporate a delivery system to bring the parameters of hydraulic fluid (especially its pressure) to the values needed, and a distributing system to distribute hydraulic fluid between separate hydraulic cylinders. The delivery system includes a tank 102 (FIGS. 3,4) filled with hydraulic fluid, a pump 103 driven by an electric motor 104 connected to the pump through a coupling 105, a filter 106, a relief valve 107, non-return valves 108 and 109, and a measuring gauge 110.

A distributing system 111 (FIG. 3) includes adjustable throttle valves 112, 113 and 114 (FIG. 4), reversible control valves 115, 116 and 117, and a hydraulic fluid flow divider 118.

Figure 4:
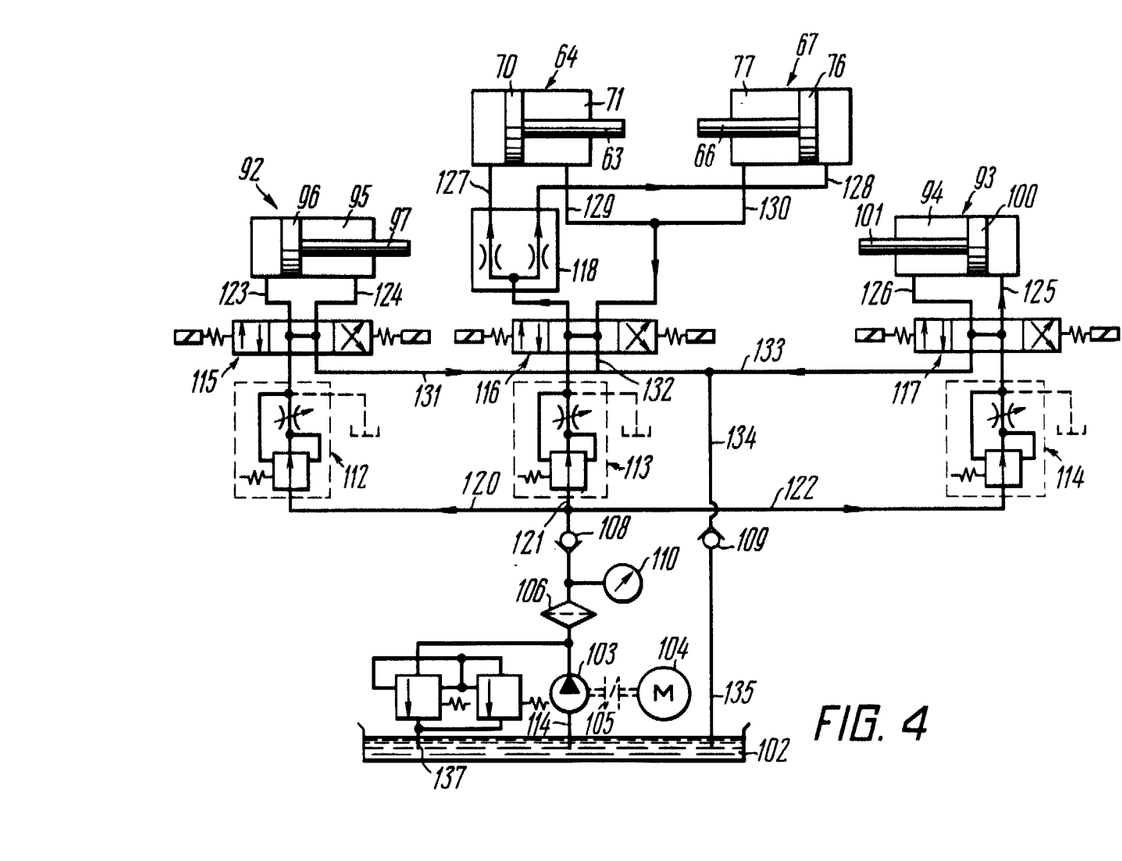
FIG. 4 is a diagrammatic view of the hydraulic control system of the automatically-operated device for assembling slotless stator of electrical machine, according to the invention.

The present device with the automated drive for assembling the slotless stators of the electrical machines functions as follows (refer to FIGS. 3 and 4).

In the initial position, the front stock 72 and rear stock 78 are moved away from the yoke holder 38 to their extreme positions. This is done by means of the corresponding hydraulic cylinders 92 and 93 of the stock displacing mechanism, operation of the hydraulic system is dealt with in more detail later on.

Punches 42 and 42¹ are moved to the extreme left-hand and right-hand positions respectively (as indicated in FIG. 3). This is achieved by operating the corresponding hydraulic cylinders 64 and 67. The electric motor 80 and the electromagnetic coupling 89 of the mechanism for turning the assembling template 37 are switched off. The electric motor 104 of the pump 103 is switched off. The tank 102 and the entire hydraulic system comprising the delivery and distributing systems are filled with hydraulic fluid.

In the given specific case, a mineral machine oil is used to function as the hydraulic fluid. A direct current source with its own switch (not shown) is connected to the magnetizing winding 44 of the assembling template 37 through terminal clamps 53. A direct current source with the corresponding switch (not shown) is also connected to the magnetizing winding 55 of the yoke holder 38 through the terminal clamps 59. The above switches of the direct current sources are in the OFF position and magnetizing windings 44 of the assembling template 37, and 55 of the yoke holder 38 are deenergized.

Segments 60 of the punch 42 are urged by springs 61 to the core 69 of the casing 68 of the hydraulic cylinder 64, while segments 60 of the punch 42¹ are urged by the same springs 61, springs 61 of the punch 42¹ are not visible in the drawing, to the hollow core 75 of the casing 74 of the hydraulic cylinder 67.

Preliminarily, the electric motor 104 of the pump 103 is switched on and hydraulic fluid is brought to operating parameters, particularly to a normal pressure in the hydraulic control system for stable and reliable operation of this system.

Hydraulic fluid is drawn into an intake pipe connection 119 by the pump 103 and through the filter 106 and non-return valve 108 and is delivered to the distributing system 111. Through pipes 120, 121 and 122, hydraulic fluid is distributed between adjustable throttle valves 112, 113 and 114, respectively. After the adjustable throttle valve 112 through the reversing control valve 115, fluid can be delivered into the space 95 of the hydraulic cylinder 92 via a pipe connection 123 to the left of the piston 96 or via pipe connection 124 to the right of this piston. Similarly, after the adjustable throttle valve 114 through the reversing control valve 117, hydraulic fluid can be delivered into the space 99 of the hydraulic cylinder 93 via a pipe connection 125 to the right of the piston 100 or via a pipe connection 126 to the left of this piston.

After the adjustable throttle valve 113 through the reversible control valve 116 and the fluid flow divider 118, hydraulic fluid can be delivered simultaneously to the two hydraulic cylinders 64 and 67 via pipe connections 127 and 128, respectively to the space 71 to the left of the piston 70 of the hydraulic cylinder 64 and to the space 77 to the right of the piston 76 of the hydraulic cylinder 77 or via pipe connections 129 and 130, respectively to the space 71 to the right of the piston 70 of the hydraulic cylinder 64 and to the space 77 to the left of the piston 76 of the hydraulic cylinder 67.

After the hydraulic cylinders 92, 64, 67 and 93 through pipes 131, 132 and then through a pipe 134 via the non-return valve 109, hydraulic fluid returns to the tank 102 via a return pipe connection 135.

At a considerable increase of hydraulic fluid pressure as compared with the normal, the relief valve 107 is unseated to partially release hydraulic fluid to the tank 102 directly after the pump 103 via a pipe 136, the relief valve 107 and a return pipe connection 137.

This results in a reduction of fluid pressure in the hydraulic system. Viewing the pressure gauge 110, an operator is always in a position to determine the actual value of fluid pressure in the hydraulic system.

Having made certain that the hydraulic control system is in the operable condition and that all units of the device being described are in their initial state, an operator switches on the electric motor 80 and proceeds directly to assembling a slotless stator.

First, the yoke 39 of the slotless stator under assembly is installed in the yoke holder 8, then the electric circuit of the magnetizing winding 44 of the assembling template is closed by actuating the corresponding switch of the said direct current source. Current will flow through the magnetizing winding 44 of the assembling template to establish a magnetic field to magnetize the housing 43 of the assembling template. Then, the electromagnetic coupling 89 is actuated to engage the output shaft 88 of the worm reduction unit 81 with the input shaft 87 of the gear reduction unit 86, which results in a turning of the assembling template 37.

Coil groups 41 are placed in succession in the given relative positions onto the side surface of the assembling template 37 and reliably fixed thereon by the magnetic field. The electromagnetic coupling 89 is switched off and upon stopping of the assembling template, the electric circuit of the slotless stator of the electrical machine under assembly is wired by accomplishing all required electrical connections to provide an active distributed layer.

An inner cylindrical surface 138 of the yoke 39 is coated with a cementing compound. Now, the reversible control valve 115 is operated to deliver pressurized hydraulic fluid into the space 95 of the hydraulic cylinder 92, to the left of the piston 96. This causes the piston 96 moving rightward to displace the front stock 72 carrying the assembling template 37 together with coil groups 41 mounted thereon in the rightward direction. As soon as the assembling template 37 is introduced inside the yoke 30 to occupy such a position at which the active distributed layer is positioned symmetrically with respect to the yoke 39, the reversible control valve 115 is shifted to neutral position. This discontinues the hydraulic fluid delivery to the hydraulic cylinder 92 to entail stopping of the front stock 77 for which the latter cylinder is a mover. Now, the reversible control valve 117 is operated to deliver pressurized hydraulic fluid into the space 99 of the hydraulic cylinder 93, to the right of the piston 100.

This will cause the piston 100 moving leftward for displacing the rear stock 78 carrying the center 139, in the leftward direction through the medium of the rod 101. As soon as the center 139 enters tapered bore 140 in the housing 43 of the assembling template 37, the reversible control valve 117 is shifted to a neutral position. This discontinues the hydraulic fluid delivery to the hydraulic cylinder to entail stopping of the rear stock for which the latter cylinder is a mover.

As a result, the assembling template 37 together with the active distributed layer disposed thereon will be accurately fixed in the position required for realizing the subsequent operations.

Then, using hte above mentioned switches of the direct current source, the magnetizing winding 55 of the yoke holder 38 is switched on and the magnetizing winding 44 of the assembling template 37 is switched off.

This results in that under the action of the magnetic field established by the magnetizing winding 55, the yoke 39 of the slotless stator under assembly is magnetized and all the coil groups 41 of the active distributed layer are transferred simultaneously onto the cement coated inner surface 138 of the yoke 39 and fixed thereon.

In this position, the slotless stator is subsequently cured during a time period needed for the polymerization of the cementing compound and consequently for a reliable cementing of the coil groups 41 of the active distributed layer to the yoke 39.

To accelerate the process of polymerization of the cementing compound and consequently for a considerable acceleration of the entire slotless stator assembling process the cementing compound is heated by utilizing induction loss in the steel of the slotless stator under assembly by bringing a variable magnetic field to the stator. This procedure has been described in detail in the disclosure related to the first structural embodiment of the manually operated device for assembing slotless stators.

In the given case, a procedure is applied at which the magnetizing winding 55 of the yoke holder is made sectional and a number of coils of this winding are connected to an alternating current source.

Upon completion of the cement polymerization process and consequently upon reliable cementing of the coil groups 41 to the yoke 39, the coils of the magnetizing winding 55 are disconnected from power sources, a number of coils from the alternating current source and the remaining number of coils from the direct current source.

Presently, forming of the head portions 40 and 40¹ of the coil groups is performed by bending them toward the ends of the yoke 39 of the slotless stator and their subsequent pressing.

For this purpose, the reversible control valve 116 is operated so that to deliver pressurized hydraulic fluid into the space 71 of the hydraulic cylinder 64, to the left of the piston 70, and into the space 77 of the hydraulic cylinder 67, to the right of the piston 76.

This will cause the piston 70 of the hydraulic cylinder 64 moving rightward to displace the punch 42 in the rightward direction, while the piston 76 of the hydraulic cylinder 67 will be moving leftward to displace the punch 42¹ in the leftward direction.

The punches 42 and 42¹ upon coming into contact with the head portions 40 and 40¹ punch 42, with head portion 40, while punch 42¹ with head portion 40¹, will first bend, then press these portions by shaping them to match the corresponding said forming surfaces of the punches 42 and 42¹.

Upon completion of the process of forming the head portions 40 and 40¹ of the coil groups 41, the reversible control valve 116 is operated to deliver pressurized hydraulic fluid into the space 71 of the hydraulic cylinder 64, to the right of the piston 70, but into the space 77 of the hydraulic cylinder 67, to the left of the piston 76. This will cause the piston 70 moving leftward to displace the punch 42 in the leftward direction, while the piston 76 of the hydraulic cylinder 67 will be moving rightward to displace the punch 42¹ in the rightward direction. As soon as the punches 42 and 42¹ are returned to the initial position, the reversible control valve 116 is shifted to the neutral position. Fluid delivery to the hydraulic cylinders 64 and 67 is discontinued to entail stopping of the punches 42 and 42¹ for which the latter cylinders are movers. Then, the reversible control valve 117 is operated to deliver pressurized hydraulic fluid into the space 99 of the hydraulic cylinder 93, to the left of the piston 100. This causes the piston 100 moving rightward to displace the rear stock 78 carrying the center 139, through the medium of the rod 101, in the righward direction. As soon as the rear stock 78 returns to the initial position, the reversible control valve 117 is shifted to the neutral position. Hydraulic fluid delivery to the hydraulic cylinder 93 is discontinued to entail stopping of the rear stock 79 for which the latter cylinder is a mover. Now, the reversible control valve 115 is operated to deliver pressurized hydraulic fluid into the space 95 of the hydraulic cylinder 92, to the right of the piston 96. This will cause the piston 96 moving leftward to displace the front stock 72 carrying the assembling template, through the medium of the rod 97, in the leftward direction. As soon as the front stock 72 returns to the initial position, the reversible control valve 115 is shifted to the neutral position. Hydraulic fluid delivery to the hydraulic cylinder is discontinued to entail stopping of the front stock 72 for which the latter cylinder is a mover. After removing the cheek 58 of the circular casing 54, the assembled slotless stator is removed from the holder 38.

The yoke of a next slotless stator to be assembled is installed into the holder 38 and the entire process above described is repeated.

The drive of the second structural embodiment of the device pursuant to the invention is named automated because practically all moving units of this device are provided with actuating mechanisms comprising electric motor and hydraulic motors in the form of hydraulic cylinders. All of these actuating mechanisms can be operated in a given sequence by means of any type of known monitoring device. For example, such a monitoring device may take the form of a camshaft commonly used in automated machine tools with cams of determined configuration arranged in a determined fashion. With the camshaft rotating, these cams, in a given sequence determined by their relative positioning, will close and open the corresponding electrical circuits of the electric motors 80 and 104, electromagnetic coupling 89, magnetizing winding 44 of the assembling template 37, and the magnetizing winding 55 of the yoke holder 38, as well operate the reversible hydraulic control valves 115, 116 and 117.

The monitoring device may be arranged in known layouts with the employment of widely popular electrical elements, namely relays operating without time delay (intermediate relays) and those operating with a time delay (timing relays), magnetic contactors and starters, electromagnets, line switches, etc.

Apparently, as may be seen from the two specific structural embodiments of the device pertaining to the invention, a multiplicity of structural variations is possible on the basis of commonly used structural layouts with the employment of various widely known kinematic and electrical arrangements, actuating mechanisms, outfits.

However, the basic principle which is the subject of the invention consists in performing all operations of providing the active distributed layer beyond the yoke on the assembling template and a subsequent simultaneous transfer of this active distributed layer onto the yoke of the slotless stator being assembled, and also in using the magnetic field for fixing the coil groups on the assembling template and the transfer of these coil groups onto the yoke remains unchanged to assure high efficiency in the series and mass production of electrical machines with a slotless stator.

Trial testing of the present device for assembling slotless stators of electrical machines even in its simplest structural embodiment, with manual drive, has proved the efficiency of this device.

In assembling slotless stators of electrical machines rated at 180 W, a single operator's production has amounted to 20 assembled slotless stators per hour.

At present, this productivity fully meets the requirements not only of a series but of mass production of the corresponding electrical machines.

What we claim is:

1. A method of assembling a slotless stator of an electrical machine provided with an active distributed layer whose coil groups are cemented to a stator yoke, comprising the following steps to be effected in the described succession:

a. bringing preliminarily manufactured coil groups to an assembling template in a number required for the provision of the active distributed layer of the slotless stator of the electrical machine under assembly;

b. establishing a stationary magnetic field to magnetize the assembling template;

c. fixing the coil groups by a stationary magnetic field on the assembling template to assure their given relative positioning;

d. accomplishing all electrical connections resulting in the provision of the active distributed layer;

e. coating a surface of the yoke of the slotless stator under assembly with a cementing compound;

f. introducing the assembling template with the coil groups disposed thereon inside the yoke of the slotless stator under assembly;

g. establishing a magnetic field to magnetize said yoke while the assembling template is freed of its magnetic field to effect a simultaneous transfer of all the coil groups of the active distributed layer onto the surface of the yoke and their pressing with a force sufficient for holding thereof in the course of cementing;

h. curing the slotless stator under assembly during a time period sufficient for polymerization of the cementing compound;

i. removing the magnetic field from the side of the yoke;

j. and forming head portions of the coil groups by bending said head portions toward the end faces of the yoke of the stator under assembly and pressing.

2. The method of assembling the slotless stator of the electrical machine as set forth in claim 1, comprising accelerating polymerization of the cementing compound by heating through utilization of the induction loss in the steel of the slotless stator under assembly when a variable magnetic field is brought to it.

* * * * *